US010259060B2

(12) United States Patent
Sugino et al.

(10) Patent No.: US 10,259,060 B2
(45) Date of Patent: Apr. 16, 2019

(54) RECIPROCATING TOOL

(71) Applicant: MAKITA CORPORATION, Anjo-shi, Aichi (JP)

(72) Inventors: Yudai Sugino, Anjo (JP); Tomohiro Ukai, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 15/045,692

(22) Filed: Feb. 17, 2016

(65) Prior Publication Data

US 2016/0303668 A1    Oct. 20, 2016

(30) Foreign Application Priority Data

Apr. 17, 2015  (JP) .................................. 2015-085223

(51) Int. Cl.
*B23D 49/16* (2006.01)
*B23D 51/16* (2006.01)

(52) U.S. Cl.
CPC ........... *B23D 49/162* (2013.01); *B23D 51/16* (2013.01); *Y10T 74/18208* (2015.01); *Y10T 83/8824* (2015.04)

(58) Field of Classification Search
CPC ...... B23D 51/16; B23D 51/10; B23D 49/162; B23D 49/165; B23D 49/167; B23D 49/11; Y10T 74/18256; Y10T 74/18208; Y10T 74/18024; Y10T 74/18248; Y10T 74/18344; Y10T 83/8824
USPC .......................... 30/392, 393, 394; 74/50, 44
See application file for complete search history.

(56) References Cited

U.S. PATENT DOCUMENTS

| 3,270,369 A | 9/1966 | Mandell |
| 4,498,450 A * | 2/1985 | Klein ..................... B28D 1/066 125/16.01 |
| 5,212,887 A * | 5/1993 | Farmerie .............. B23D 49/165 30/392 |
| 6,327,923 B1 * | 12/2001 | Greppmair .............. E02D 3/074 404/133.05 |
| 7,996,996 B2 * | 8/2011 | Hirabayashi ........... B23D 51/16 30/392 |

(Continued)

FOREIGN PATENT DOCUMENTS

| JP | H06-198601 A | 7/1994 |
| JP | 2005-052895 A | 3/2005 |

OTHER PUBLICATIONS

Aug. 7, 2018 Office Action issued in Japanese Patent Application No. 2015-085223.

*Primary Examiner* — Laura M Lee
(74) *Attorney, Agent, or Firm* — Oliff PLC

(57) ABSTRACT

A reciprocating tool includes a motor, a crank, a connecting rod, a rod, a tool bit, and a counter weight. The tool bit is mounted such that the action portion is positioned on a side opposite to a side with the rod central axis or the extended line of the rod central axis viewing from the rotational center of the crank. The first eccentric shaft and the second eccentric shaft are disposed such that at a position where the first eccentric shaft causes the rod to reach top dead center (TDC), the second eccentric shaft causes the counter weight to reach bottom dead center (BDC) or a point before the BDC, and at a position where the first eccentric shaft causes the rod to reach the BDC, the second eccentric shaft causes the counter weight to reach a point before the TDC.

20 Claims, 9 Drawing Sheets

(56) References Cited

U.S. PATENT DOCUMENTS

| | | | | |
|---|---|---|---|---|
| 8,549,762 | B2* | 10/2013 | Oberheim | B23D 49/165 30/392 |
| 9,579,735 | B2* | 2/2017 | Wattenbach | B23D 49/165 |
| 2004/0187324 | A1* | 9/2004 | James | B23D 51/16 30/394 |
| 2004/0231170 | A1* | 11/2004 | Neitzell | B23D 51/01 30/340 |
| 2004/0255475 | A1* | 12/2004 | Hirabayashi | B23D 51/16 30/392 |
| 2005/0126018 | A1* | 6/2005 | Haas | B23D 51/16 30/394 |
| 2008/0189961 | A1* | 8/2008 | Oberheim | B23D 51/16 30/393 |
| 2010/0107427 | A1* | 5/2010 | Baxivanelis | B23D 51/16 30/392 |
| 2011/0107608 | A1 | 5/2011 | Wattenbach et al. | |
| 2014/0283394 | A1* | 9/2014 | Adams | B23D 51/16 30/374 |
| 2016/0303668 | A1* | 10/2016 | Sugino | B23D 51/16 |

* cited by examiner

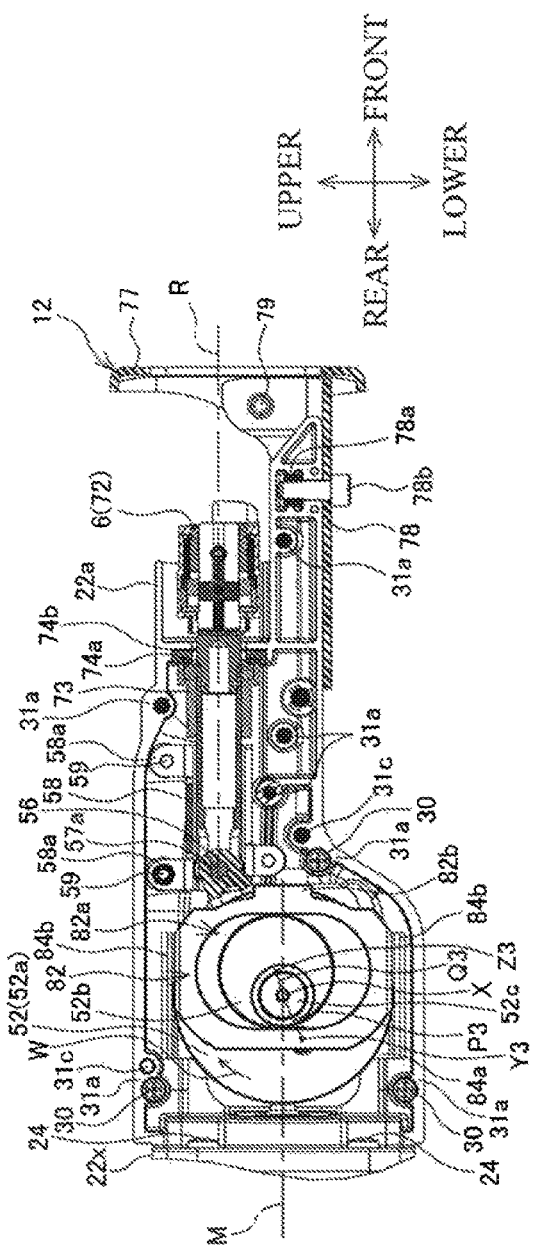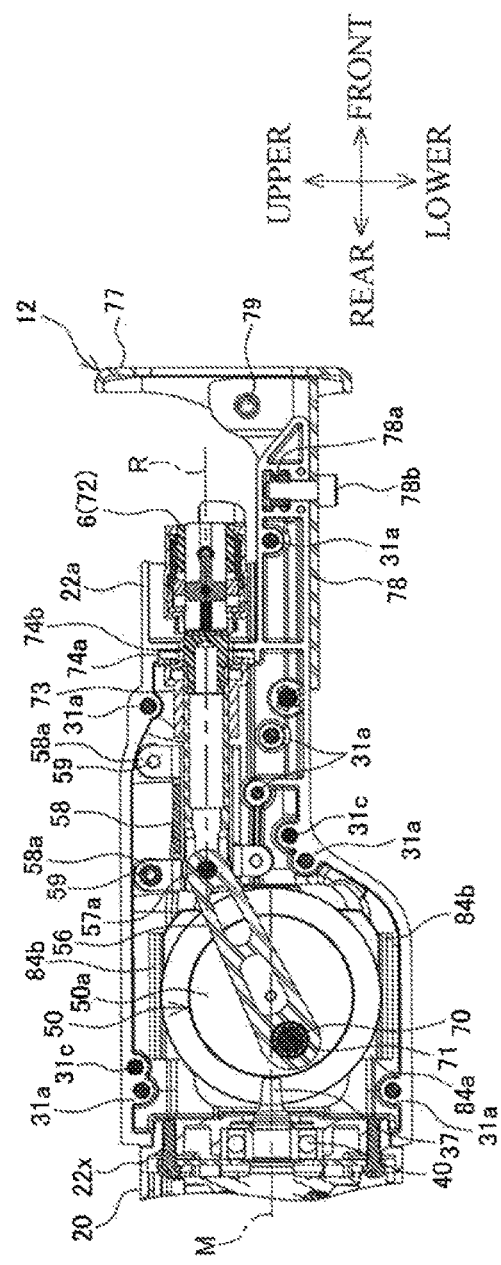

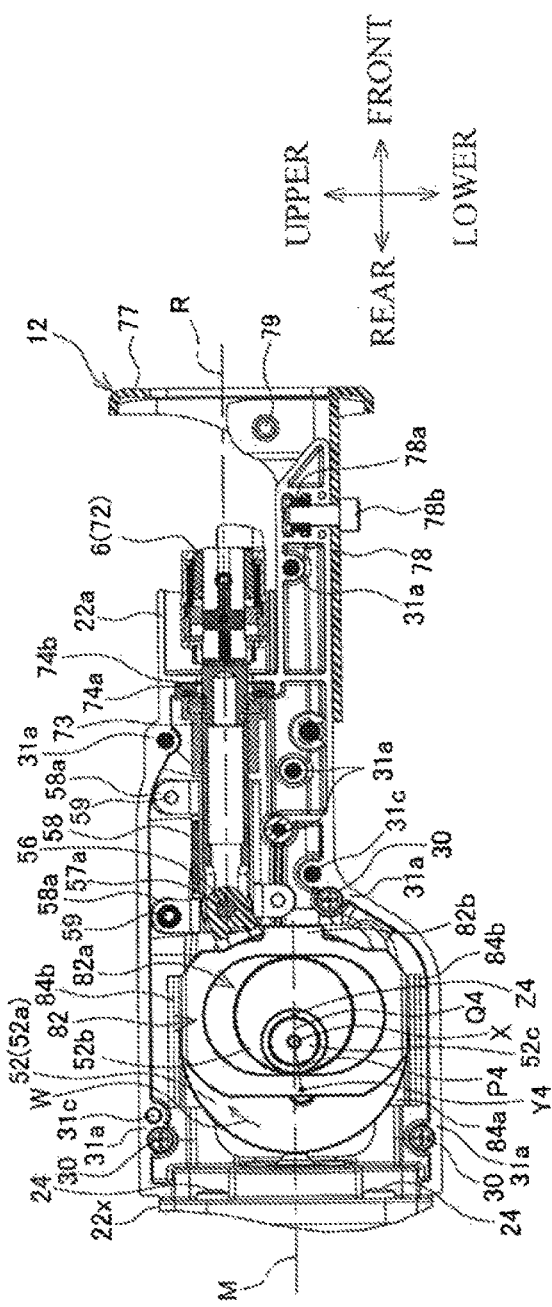

RECIPROCATING TOOL

BACKGROUND

This application claims the benefit of Japanese Patent Application Number 2015-085223 filed on Apr. 17, 2015, the entirety of winch is incorporated by reference.

Technical Field

The disclosure relates to a reciprocating tool with an output unit to reciprocate, which includes a reciprocating cutting tool for cutting workpieces by reciprocation of a blade.

Related Art

As disclosed in JP-6-198601-A, there has been known a power operated reciprocating saw in which a plunger including a saw blade is reciprocated for cutting operations. The power operated reciprocating saw has a mechanism for reducing vibration, the mechanism including a balance weight (counter weight) which reciprocates in the opposite phase to the plunger.

The saw has a horizontal disc-shaped gear member that meshes with teeth on the end of a motor output shaft. The gear member has a crank pin that is eccentric with respect to the rotational center of the gear and a roller disposed on the outer periphery of the crank pin. The plunger includes a rectilinear slot to accommodate the crank pin and the roller, and the rectilinear slot is perpendicular to the longer side direction (front-rear direction) of the plunger. The crank pin and the roller are moved by the rotation of the near member so as to push the inner wall of the rectilinear slot in the front-rear direction while reciprocating in the rectilinear slot. Accordingly, the plunger is reciprocated.

The saw has a horizontal disc-shaped disk mounted on the gear member. The disk has fasteners screwed into the pin of the gear member on the peripheral edge of the inferior surface. Further, the disk has the crank pin and the roller at the position which is on the peripheral edge of the top surface and opposite to the fasteners in the radial direction. The crank pin and roller are included in the slot disposed on the counter weight. The disk rotates in association with the rotation of the gear member, which causes the counter weight to reciprocate in the opposite phase to the plunger via the roller of the disk and the slot of the balance weight member.

The mechanism disclosed in JP-6-198601-A is configured to reduce the vibration by the reciprocating of the plunger and the counter weight caused by the gear member and the crank pin of the disk. However, the mechanism substantially restricts the arrangement of the plunger and the counter weight on the straight line passing through the rotational center of the gear member and the disk. Therefore, it is an object of the disclosure to provide a reciprocating tool that can reduce the vibration while having an output unit to reciprocate and disposes the output unit and a counter eight more freely.

SUMMARY

In order to achieve the above-described object, a reciprocating tool according to a first aspect of the disclosure includes a motor, a crank, a connecting rod, a rod, a tool bit with an action portion, and a counter weight. The crank is rotated by the motor. The connecting rod is coupled to a first eccentric shaft of the crank. The rod is coupled to the connecting rod. The tool bit is mounted on the rod, and the action portion acts on a workpiece. The counter weight is coupled to a second eccentric shaft a the crank. The crank has a rotational center which is not disposed on an extended line of a central axis of the rod. The tool hit is mounted such that the action portion is positioned on a side opposite, to a side on which the rod is coupled to the connecting rod. The first eccentric shaft and the second eccentric shaft are disposed such that at a position here the first eccentric shall causes the rod to reach a top dead center (TDC), the second eccentric shaft causes the counter weight to reach a bottom dead center (BDC) or a point before the BDC, and at a position where the first eccentric shaft causes the rod to reach the BDC, the second eccentric shaft causes the counter weight to reach a point before the TDC.

BRIEF DESCRIPTION OF DRAWINGS

FIGS. 8A is a view of FIG. 6A when the rod is at BDC.

FIGS. 8B is a view of FIG. 6B when the rod is at BDC.

FIGS. 9A is a view of FIG. 6A when the counter weight is at TDC.

FIGS. 9B is a view of FIG. 6B when the counter weight is at TDC.

DETAILED DESCRIPTION

The following describes embodiments and modifications of the disclosure based on the drawings as necessary.

These embodiments relate to a power tool as one example of a reciprocating tool, and more specifically, relate to a reciprocating saw as a cutting power tool.

The disclosure is not limited to the embodiments and modifications.

Figure 1:
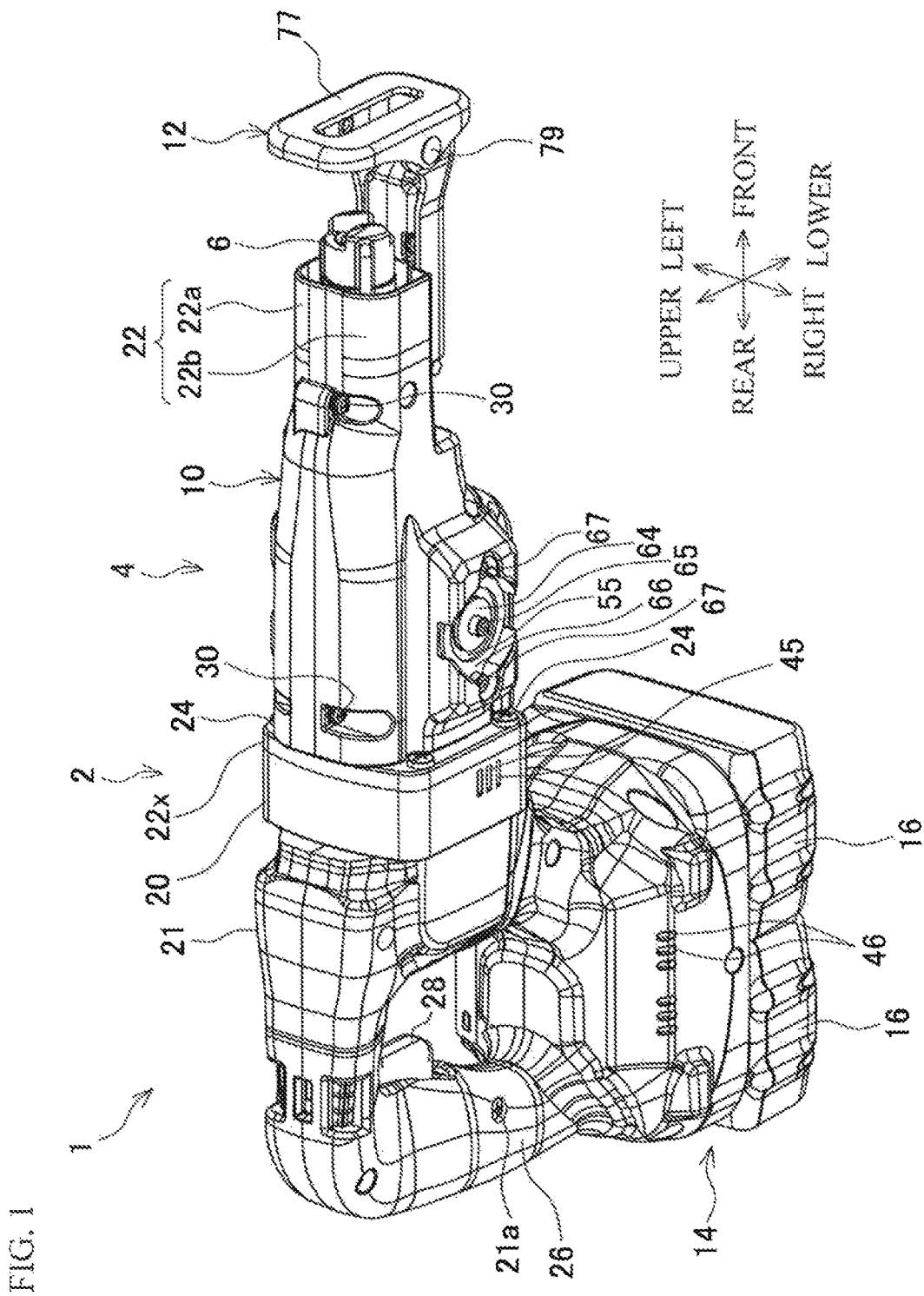
FIG. 1 is a perspective view showing an external appearance of a reciprocating saw according to the disclosure.
Figure 2:
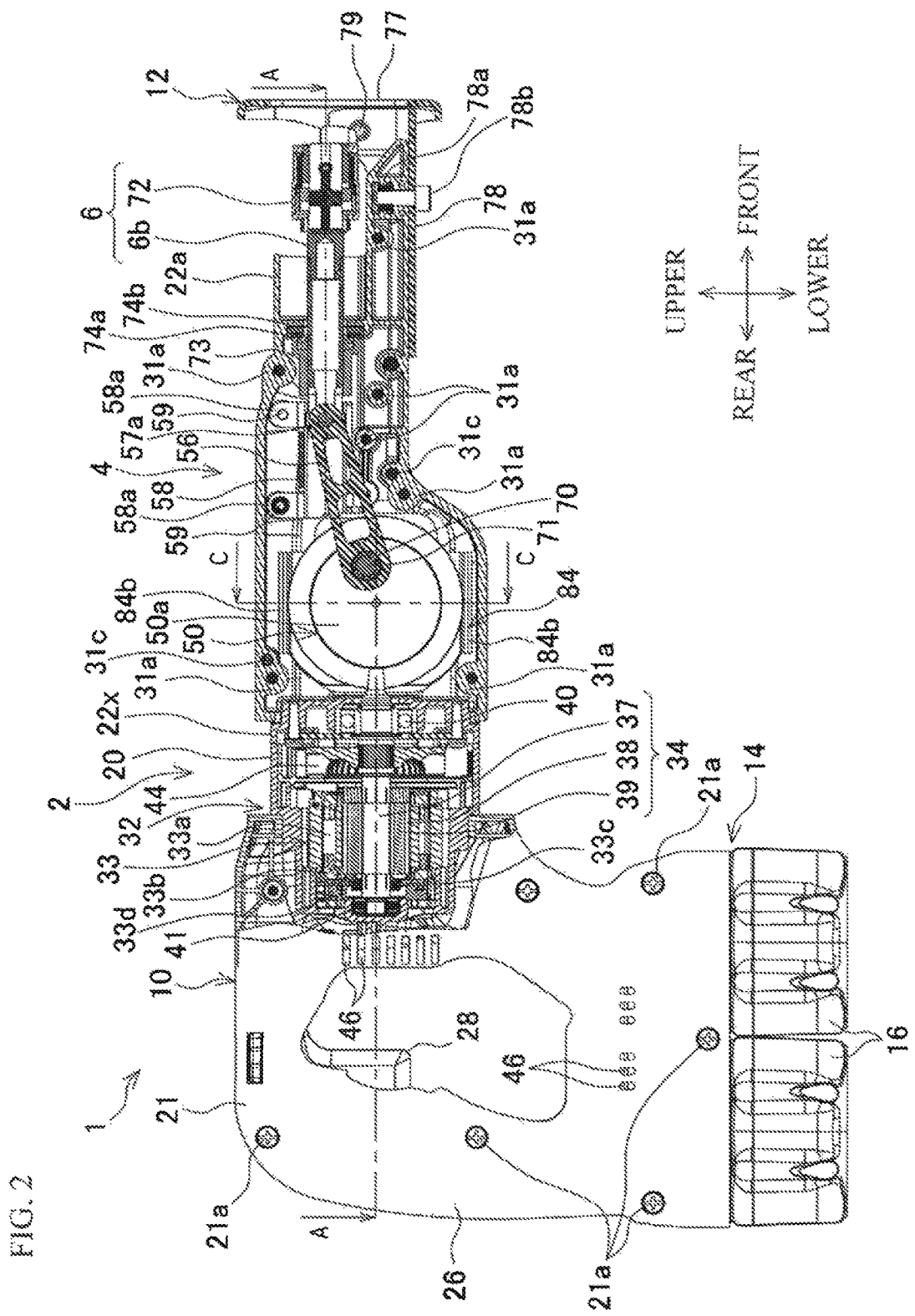
FIG. 2 is a vertical cross-sectional view of a part of FIG. 1.
Figure 3:
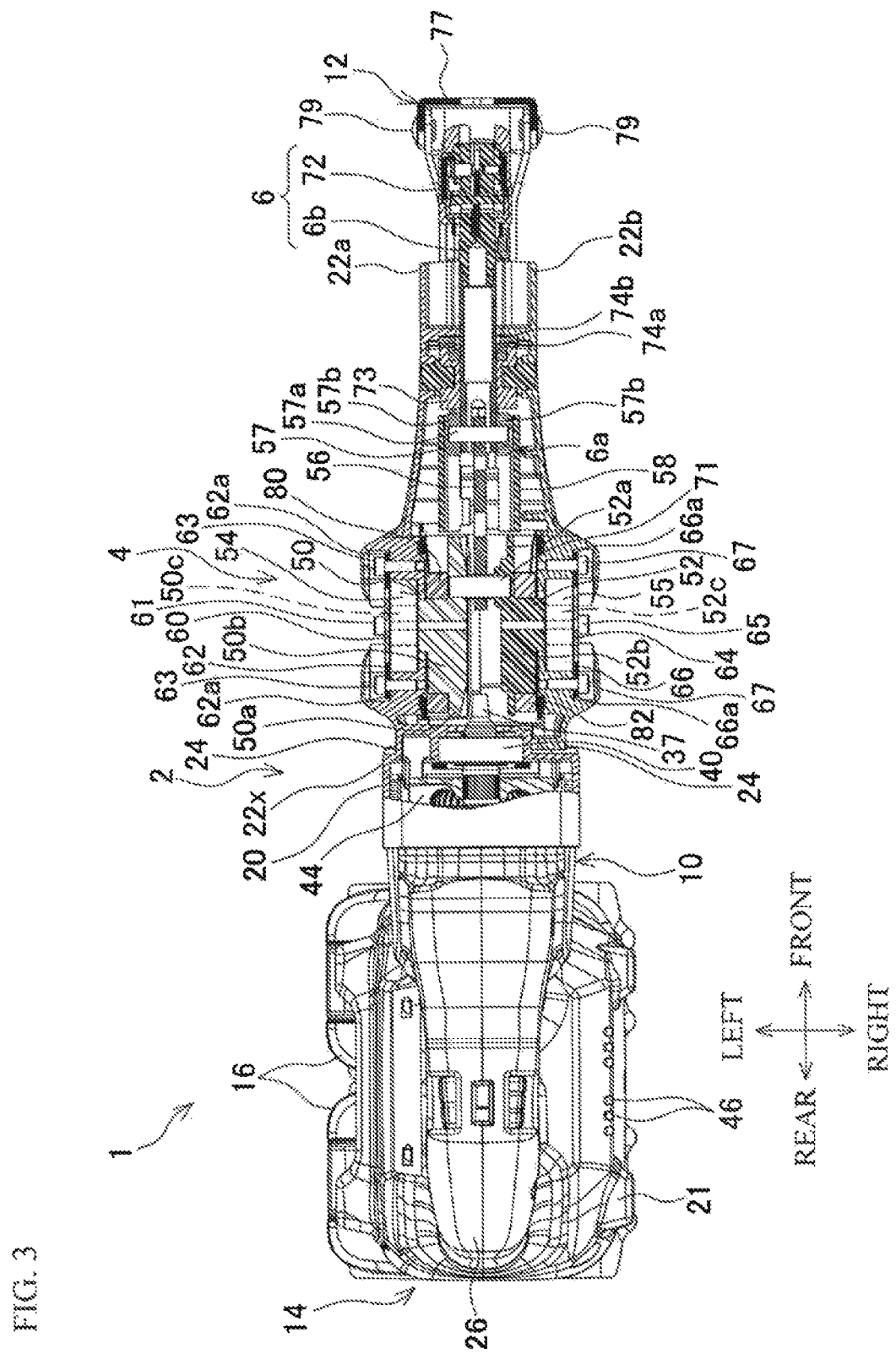
FIG. 3 is a cross-sectional view taken along the line A-A of FIG. 2.
Figure 4:
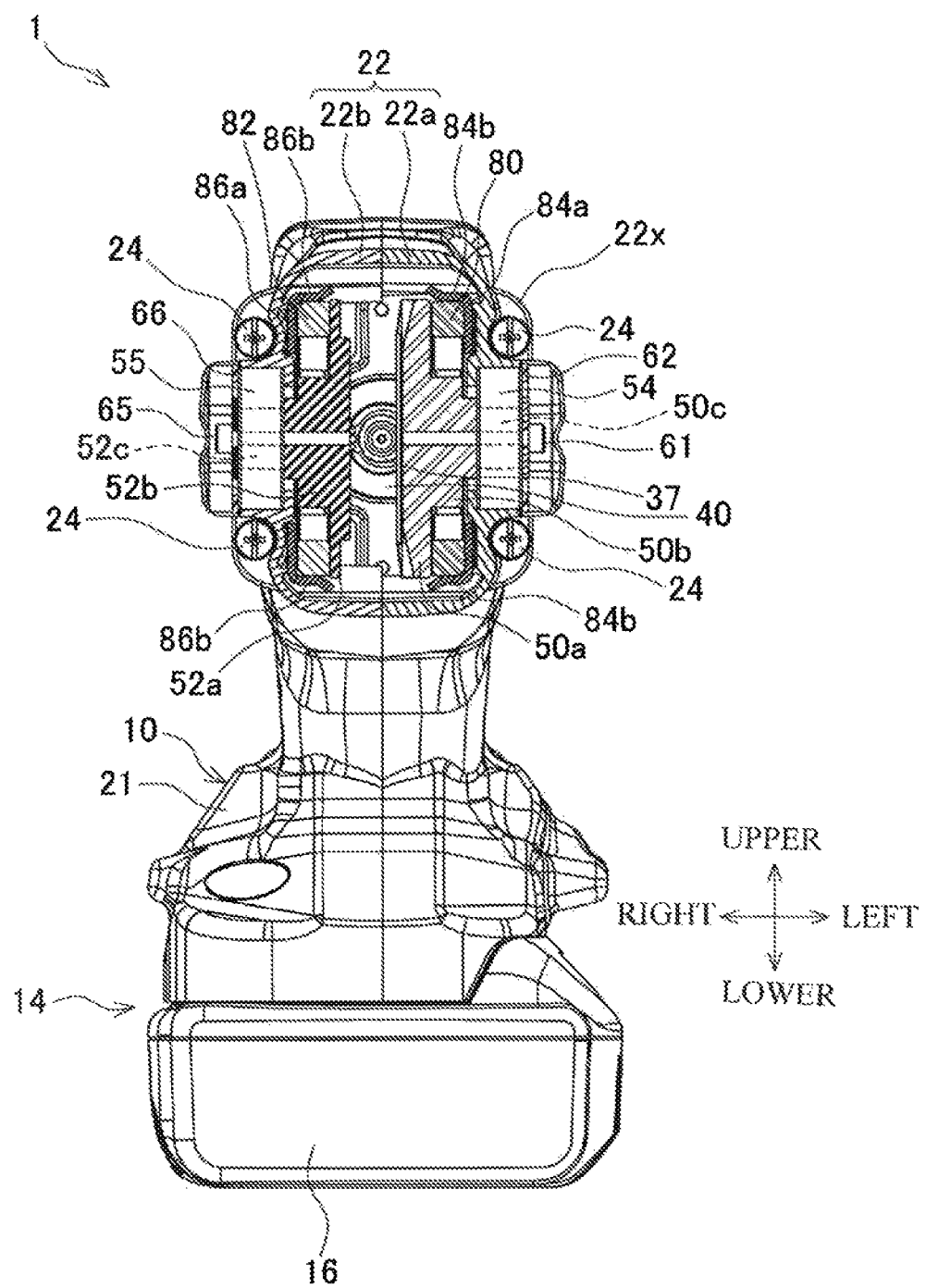
FIG. 4 is a cross-sectional view taken along the line C-C of FIG. 2.
Figure 5:
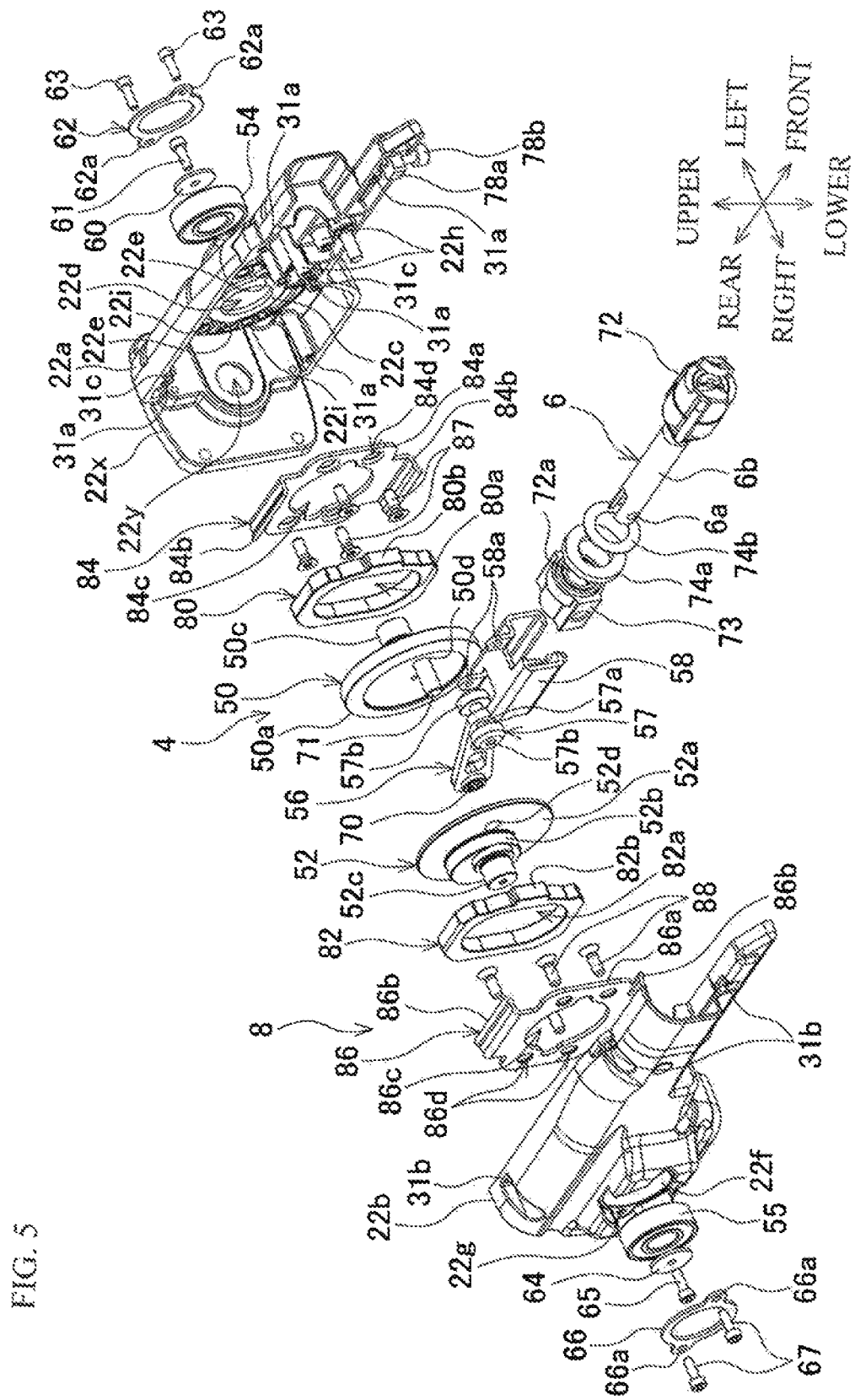
FIG. 5 is an exploded perspective view of a pan of an internal mechanism of the reciprocating saw according to the disclosure.
Figure 6A:
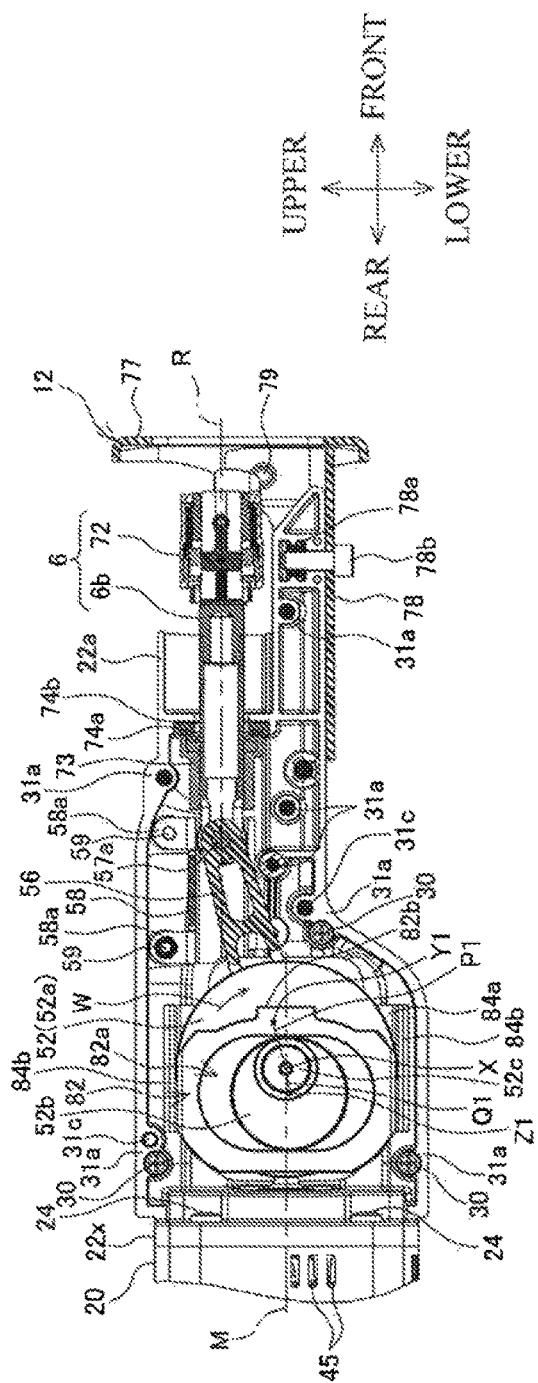
FIG. 6A is a vertical cross-sectional view of the front portion of FIG. 2 when a rod is at TDC.
Figure 6B:
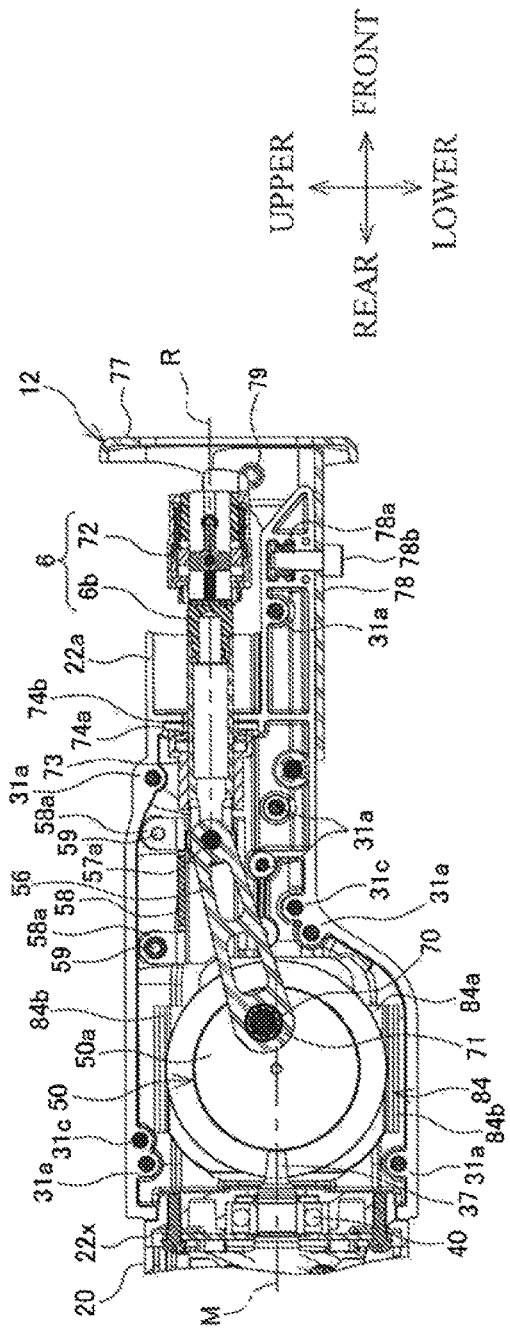
FIG. 6B is a view of the front portion of FIG. 2 omitting a right crank and a right counter weight when the rod is at TDC.
Figures 7A, 7B:
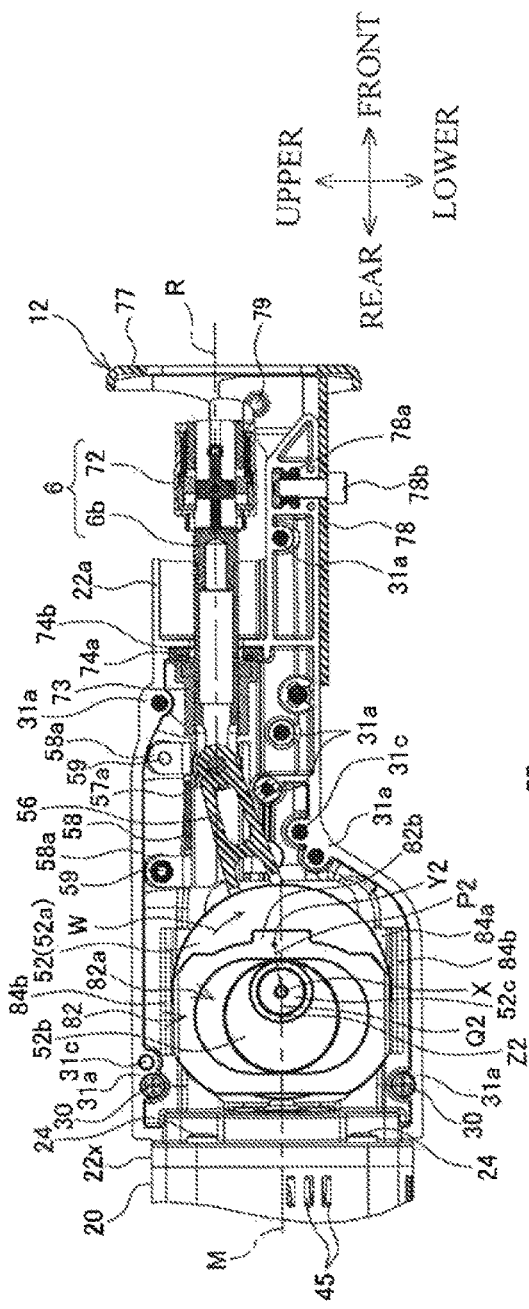
FIGS. 7A is a view of FIG. 6A when the counter weight is at BDC.
FIGS. 7B is a view of FIG. 6B when the counter weight is at BDC.

FIG. 1 is a perspective view showing an external appearance of a reciprocating saw 1. FIG. 2 is a vertical cross-sectional view of a pan of the reciprocating saw 1. FIG. 3 is a cross-sectional view taken along, the line A-A of FIG. 2. FIG. 4 is a cross-sectional view taken along the line C-C of FIG. 2. FIG. 5 is an exploded perspective view or a part of the internal mechanism of the reciprocating saw 1. FIG. 6A is a vertical cross-sectional view of the front portion of the reciprocating saw 1 at a rod 6 TDC. FIG. 6B is a view omitting a right crank 52 and a right counter weight 82 from FIG. 6A. FIGS. 7A and 7B are views of FIGS. 6A and 6B at a left counter weight 80 BDC of the reciprocating saw 1. FIGS. 8A and 8B are views of FIGS. 6A and 6B at the rod 6 BDC of the reciprocating saw 1. FIGS. 9A and 9B are views of FIGS. 6A and 6B at the left counter weight 80 TDC of the reciprocating saw 1.

The right side of FIG. 2 and FIG. 3 are the front side of the reciprocating saw 1. The upper side of FIG. 2 and FIG. 4 are the upper side of the reciprocating saw 1. The upper side of FIG. 3 and the right side of FIG. 4 are the left side of the reciprocating saw 1. Respective directions are determined for convenience of explanation. The actual directions may vary in accordance with workpieces, and directions of operators.

The reciprocating saw 1 includes it power unit 2, a power transmission unit 4 as a reciprocation converter, the rod 6 as an output unit coupling to the power transmission unit 4, a counter weight mechanism 8 combined with the power transmission unit 4, a housing 10 that houses these units, a guide shoe 12 protruding from the forward end portion of the housing 10, a battery mounting portion 14 disposed on the rear lower portion of the housing 10, and two batteries 16, 16 removably mounted on the battery mounting portion 14.

The housing 10 includes a cylindrical motor housing 20 that houses the power unit 2, a grip housing 21 secured to the rear outside of the motor housing 20, and a front housing 22 that is secured to the front side of the motor housing 20 and houses the power transmission unit 4, the rod 6, and the counter weight mechanism 8.

The grip housing 21 is formed in a loop shape. The rear portion of the loop is a handle portion 26 extending in a vertical direction. On the front side of the handle portion 26, a switch 28 of a trigger type is disposed. The grip housing 21 is separated into right and left, and the right and left grip housings are combined by screws 21a, 21a in the right-left direction.

The front housing 22 is separated into right and left, and has a front left housing 22a and a front right housing 22b. The front right housing 22b is secured to the front left housing 22a by a plurality of screws 30, 30 in the right-left direction. The front left housing 22a includes screw boss portions 31a, 31a corresponding u the screws 30, 30. The front right housing 22b includes screw hole portions 31b, 31b corresponding to the screws 30, 30. Adjacent to a part of the screw boss portions 31a on the front left housing 22a, short cylindrical boss portions 31c, 31c are disposed to protrude. Corresponding to each boss portion 31c, boss receiving holes (not illustrated) are disposed on the front right housing 22b.

The rear end portion of the front left housing 22a expands to upper and lower, and right and left to form a rear surface portion 22x that extends to the right side reaching the inner surface of the rear end portion of the front right housing 22b. The rear surface portion 22x includes a from left housing rear hole 22y at the center.

The motor housing 20 is secured to the front left housing 22a by passing screws 24, 24 in the from-rear direction in a state where the forward end portion of the motor housing 20 is fitted to the rear surface outside edge of the rear surface portion 22x of the flout left housing 22a.

The power unit 2 has an electric motor (brushless DC motor, brushless motor) 32. The motor 32 includes a stator 33 and a rotor 34.

The stator 33 is involved in the motor housing 20, and has a stator iron core 33a with a plurality of (six pieces) internal teeth projecting inward from the inner surface of the cylindrical base portion, drive coils 33b, 33b wound on these respective internal teeth, a sensor substrate 33c that has a plurality of (three pieces) magnetic sensors and is disposed backward of the stator iron core 33a, and a short-circuit member 33d that electrically connected to the drive coils 33b, 33b by a predetermined combination and is disposed backward of the sensor substrate 33c.

The rotor 34 has a motor shaft 37 as a rotation axis, a rotor iron core 38 secured to the peripheral area of the center portion of the rotor 34, permanent magnets 39, 39 that each have a shape of a part of a cylinder and are disposed outside the rotor iron core 38 in a circumferential direction with changing the polar character alternately, and permanent magnets for a sensor (not illustrated) disposed radially backward the sensor substrate 33c side) of these parts. The rotor iron core 38, the permanent magnets 39, 39, and the permanent magnets for the sensor constitute a rotor assembly.

The motor shaft 37 includes teeth on the peripheral area of the forward end portion. The from portion of the motor shaft 37 passes through the front left housing rear hole 22y.

The motor 32 is electrically connected to the batteries 16, 16 and the switch 28. The switch 28 is turned on for feeding power from the batteries 16 so that the rotor 34 is rotated. Inside the grip housing 21 and on the upper side of the batters mounting portion 14, a control circuit board (not illustrated) to control the motor 32 is disposed. The control circuit board is electrically connected to the stator 33 and the batteries 16, 16 and the switch 28.

On the peripheral area of the forward end portion rear side of the motor shall 37, a motor from bearing 40 is disposed. The motor from bearing 40 rotatably supports the motor shaft 37, and is secured to the motor housing 20 (backward the front left housing rear hole 22y).

On the peripheral area of the rear end portion of the motor shall 37, a motor rear bearing 41 is disposed. The motor rear bearing 41 rotatably supports the motor shaft 37, and is secured to the motor housing 20.

Backward the motor front bearing 40 and on the peripheral area of the motor shaft 37, a fan 44 is secured. On the motor housing 20 and parts lying the left side and right side (outside the radiation direction) of the fan 44, exhaust outlets 45, 45 for passing exhaust air of the fan 44 are disposed.

On the other hand, on the upper right part of the battery mounting portion 14 and the rear side part of the motor housing 20 of the grip housing 21, air intake openings 46, 41 are disposed.

The power transmission unit 4 includes a disc-shaped left crank 50 with bevel teeth, the right crank 52 as left crank hearing 54 and a right crank bearing 55, a connecting rod 56, a roller 57, and a cylindrical roller guide 58. The left crank 50 meshes with teeth on the distal end portion of the motor shall 37, expanding in back and forth, and up and down directions. The right crank 52 in a similar shape to the left crank 50 is symmetrically disposed with respect to a surface expanding in back and forth, and up and down directions. The left crank bearing 54 and the right crank bearing 55 rotatably accommodate the left crank 50 and the right crank 52 around the axis in the right-left direction. The connecting rod 56 is disposed between the left crank 50 and the right crank 52. The roller 57 is rotatable disposed on the forward end portion of the connecting rod 56 around the axis in the right-left direction. The cylindrical roller guide 58 accommodates the roller 57 reciprocatingly movable back and forth.

The left crank 50 is disposed on the left front of the distal end portion of the motor shaft 37. The left crank 50 includes a disc-shaped base portion 50a with bevel teeth on the outside edge of the inner surface (right side surface), an eccentric portion 50b as a second eccentric shall that projects outside (left side) in a disc-shape in a state of eccentricity on a flat outer surface (left side surface) of the base portion 50a (see FIG. 4), and a shaft portion 50c projecting outside (left side) in a cylindrical shape from the outside surface of the eccentric portion 50*b*. The base portion 50*a* expands in back and forth, and up and down directions. The shaft portion 50*c* is concentric with the base portion 50*a*. The center of the base portion 50*a* and the shaft portion 50*c* is a rotational center X of the left crank 50.

The diameter (number of teeth) of the left crank 50 is larger than the diameter (number of teeth) of the motor shaft 37 of the motor 32. Then, the left crank 50 decelerates the rotation of the motor shaft 37. The motor shaft 37 rotates in a direction that causes the left crank 50 to rotate in the direction of an arrow W in FIG. 6A.

The right crank 52 is disposed on the right from of the distal end portion of the motor shaft 37. The right crank 52 includes a disc-shaped base portion 52*a* that is the innermost (left side) of the right crank 52, an eccentric portion 52*b* as a second eccentric shaft that eccentrically projects from the outside surface (right side surface) of the base portion 52*a*, and a shaft portion 52*c* protecting outside (right side) from the eccentric portion 52*b*. The base portion 52*a* has a comparatively thin thickness without the bevel teeth, different from the base portion 50*a*. The eccentric portion 52*b* and the shaft portion 52*c* are similar to the eccentric portion 50*b* and the shaft portion 50*c* of the left crank 50. The eccentric portions 50*b* and 52*b* have the aligned eccentric position.

The left crank bearing 54 rotatably supports the shaft portion 50*c* of the left crank 50. The left crank beating 54 is provided with a washer 60 on the outside (left side) of an inside wheel. A screw 61 is disposed such that the washer 60 and the shaft portion 50*c* of the left crank 50 pass through the screw. The screw 61 couples the inside wheel of the left crank bearing 54 to the shaft portion 50*c* via the washer 60.

The left crank bearing 54 is inserted in a depressed portion 22*c* formed on the left outer surface of the front left housing 22*a* rear portion from the outside (left side) the front left housing 22*a*. The depressed portion 22*c* cylindrically depresses corresponding to the outer shape of the left crank bearing 54. The depressed portion 22*c* has to hole 22*d* on the center of the bottom face, and has screw hole portions 22*e*, 22*e* on both sides of the depressed portion. With respect to the left crank bearing 54 inserted in the depressed portion 22*c*, a ring-shaped bearing retainer 62 is disposed to hold the peripheral edge (outside wheel) of the outside surface (left side surface). On the right and left sides of the bearing retainer 62, screw hole portions 62*a*, 62*a* are disposed. The bearing retainer 62 is mounted on the front left housing 22*a* by screws 63, 63 that are inserted in the corresponding screw hole portions 62*a*, 62*a* and the screw hole portions 22*e*, 22*e*.

The right crank bearing 55 rotatably supports the shaft portion 52*c* of the right crank 52. The right crank bearing 55 is installed as well as the left crank bearing 54. That is, an inside wheel of the right crank bearing 55 is secured to the shaft portion 52*c* of the right crank 52 by a washer 6 and a screw 65. The right crank bearing 55 is mounted on a depressed portion 22*f* of the front right housing 22*b* by a bearing retainer 66 and screws 67, 67. The screws 67, 67 pass through screw hole portions 66*a*, 66*a* of the bearing retainer 66 and screw hole portions 22*g*, 22*g* on both sides of the depressed portion 22*f*.

The connecting rod 56 is a member extending in the front-rear direction disposed up in front (depending on the moving position, horizontal or down in front). The connecting rod 56 includes a needle bearing 70 secured to the end portion.

The base portion 50*a* of the left crank 50 includes a pin hole 50*d* on an eccentric position different from the eccentric portion 50*b*. The base portion 52*a* of the right crank 52 includes a pin hole 52*d* on an eccentric position similar to the eccentric position on the base portion 50*a*.

Then, left and right end portions of a cylindrical connecting rod coupling pin 71 as the first eccentric shaft are inserted in the pin holes 50*d*, 52*d*. While the connecting rod coupling pin 71 can be considered as the configuration member of the left crank 50 and the right crank 52, the connecting rod coupling pin 71 can be considered as the connecting rod 56. In the latter case, the pm hole 50*d*, 52*d* (the center axis of the pin hole 50*d*, 52*d*) is the first eccentric shaft.

The inside wheel of the needle bearing 70 accommodates the connecting rod coupling pin 71.

The roller 57 includes a shaft portion 57*a* secured to the distal end portion of the connecting rod 56 in the right-left direction, and roller portions 57*b*, 57*b* rotatably disposed on the right and left distal end portions of the shaft portion 57*a*. The roller portions 57*b*, 57*b* are rollable inside the roller guide 58.

The roller guide 58 is a plate-shaped member cylindrically folded, and has a plurality of (two pieces) screw hole portions 58*a*, 58*a* on the upper portion. The front left housing 22*a* includes screw boss portions 22*h*, 22*h* which correspond to the screw hole portions 58*a*, 58*a* and are disposed to protrude inward (to the right side) on the inner surface. The roller guide 58 is secured by screws 59, 59 passing through the screw hole portions 58*a*, 58*a*.

A connecting hole 6*a* formed on the rear end portion of the rod 6 is disposed on a part of the shaft portion 57*a* of the roller 57 and between the roller portions 57*b*, 57*b* and the connecting rod 56. The shaft portion 57*a* passes through the connecting hole 6*a* so that the roller 57 (the connecting rod 56) is coupled relatively rotatable to the rod 6.

The roller guide 58 is disposed upper to the rotational center X of the left crank 50 and the right crank 52. A central axis of the rod 6 in the front-rear direction (rod central axis R) is disposed upper to a straight line in the front-rear direction passing through the middle of the rotational center X of the kit crank 50 and the right crank 52 (the straight line corresponds to a motor central axis M as a central axis of the motor shaft 37). For ease of description, the rod central axis R is assumed to include the extended line out of the rod 6 in addition to the center line within the rod 6. The same applies to the motor central axis M. When the left crank 50 and the right crank 52 is considered to be one crank, the rotational center X of the crank can be considered to be the middle of the rotational center X of the left crank 50 and the right crank 52.

When the left crank 50 rotates and the eccentric connecting rod coupling pin 71 rotates, a displacement component mainly in the front-rear direction according to the connecting rod coupling pin 71 is transmitted to the connecting rod 56. Then, the roller 57 reciprocates back and forth inside the roller guide 58 to cause the rod 6 to reciprocate back and forth. The displacement component mainly in the up and down directions according to the connecting rod coupling pin 71 is processed by the rotation of the connecting rod 56 with respect to the connecting rod coupling pin 71 via the needle bearing 71 without transmitted to the rod 6 because of the restriction of the movement to the roller 57 by the roller guide 58.

The rotation of the left crank 50 is directly transmitted to the right crank 52 by the connecting rod coupling pin 71 via the pin hole 52*d*. Then, the right crank 52 rotates with the left crank 50.

The roller 57 can be considered riot as a component of the power transmission unit 4, but as a component of the output unit (the rod 6). The roller guide 58 can be considered not as a component of the power transmission unit 4, but as a component of the output unit (the rod 6) or the front housing 22.

The rod 6 is a member extending in the front-rear direction, and includes a blade mounting portion 72 on the forward end portion. The blade mounting portion 72 bulges upper and lower, and right and left with respect to a round rod-shaped rod base 6b disposed backward the blade mounting portion 72. The blade mounting portion 72 mounts a blade (not illustrated). The blade as a tip tool is mounted such that sawteeth as an action portion for cutting action on a workpiece come lower. The workpiece is placed under the blade such that the sawteeth is operable.

The rod base 6b is disposed on a rod guide 73 on the outerside. The rod guide 73 has a bole 72a which is formed in the front-rear direction and has an identical diameter to the rod base 6b to receive the rod base 6b.

The rod guide 73 is secured with respect to the front left housing 22a and the front right housing 22b.

The rod guide 73 includes an annular seal ring 74a and a flat washer 74b inside the front portion. The seal ring 74a and the flat washer 74b are sealing members of elastic body to prevent dust from getting inside. The seal ring 74a and the flat washer 74b contact the rod base 6b at the hole of the ring in a state of allowing the rod base 6b to move back and forth. The flat washer 74b is disposed between the front left housing 22a and the from right housing 22b the seal ring 74a. The seal ring 74a is disposed between the flat washer 74b, and the flout left housing 22a, the front right housing 22b, and the rod guide 73.

The rod 6 is guided by the rod guide 73 (and the seal ring 74a and the flat washer 74b, and movable in the front-rear direction.

The blade passes through the guide shoe 12. The guide shoe 12 has a shoe plate 77 cotactable with processing materials, and a shoe supporter 78 disposed between the shoe plate 77, and the front left housing 22a and the front right housing 22b. The shoe supporter 78 is secured to the lower side of the forward end portion of the front housing 22 by a screw 78b screwed into a small block 78a that is sandwiched between the forward end portion of the front left housing 22a and the forward end portion of the front right housing 22b. The shoe plate 7 is mounted on the forward end portion of the shoe supporter 78 via shafts 79, 79 disposed in the right-left direction, and rotatable around the shafts 79, 79.

The counter weight mechanism 8 includes the left counter eight 80 and the right counter weight 82, and a left counter weight guide 84 and a right counter weight guide 86. The left counter weight guide 84 and the right counter weight guide 86 may be included in the front housing 22.

The left counter weight 80 is a metallic plate-shaped member expanding in back and forth, and up and down directions. The left counter weight 80 has an elliptical hole 80a longer in the up and down direction, and a projecting portion 80b projecting forward with respect to the upper and lower of the front portion. The eccentric portion 50b of the left crank 50 is inserted in the hole 80a, and the front and rear parts of the cursed surface of the eccentric portion 50b contact with the front and rear inner surfaces of the hole 80a. The projecting portion 80b is disposed on the position where the projecting portion 80b does not interfere in the roller guide 58 and the roller 57 even if the left counter weight 80 moves to the frontmost (TDC). The left counter weight 80 including the projecting portion 80b is disposed to be vertically symmetrical with respect to a horizontal line in the front-rear direction, the horizontal line passing through the center of the left counter weight 80 in the vertical direction. The horizontal line corresponds to the motor central axis M.

The right counter weight 82 is configured to be similar to the left counter weight 80, and includes a hole 82a to accommodate the eccentric portion 52b, and a projecting portion 82b.

When the left crank 50 rotates, the action of the force transmits from the eccentric portion 50b to the hole 80a so that the left counter weight 80 reciprocates back and forth. The eccentric portion 50b reciprocates inside the hole 80a in a vertical direction, without pushing the upper and lower inner surfaces of the hole 80a. This causes the component in the vertical direction according to the rotation of the eccentric portion Sob not to act on the left counter weight 80.

The right counter weight 82 moves back and forth by the rotation of the right crank 52 similarly to the left counter weight 80. The right crank 52 rotates similarly to the left crank 50, and the eccentric portion 52b is in the identical phase to the eccentric portion 50b. Thus, the right counter weight 82 and the left counter weight 80 coinstantaneously rotate without rotational deviation.

The left counter weight guide 84 is a folded plate-shaped member. The left counter weight guide 84 includes a guide base 84a expanding in back and forth, and up and down directions, guide support portions 84b, 84b horizontally standing from the upper side and the lower side of the guide base 84a to inward (right side), a circular hole portion 84c opened at the center of the guide base 84a, and a plurality of (four pieces) screw holes 84d, 84d disposed on the peripheral area of the hole portion 84c. The left counter weight guide 84 is secured to screw boss portions 22i, 22i disposed on the peripheral area of the depressed portion 22c on the inner surface of the front left housing 22a by screws 87, 87 passing through the screw holes 84d, 84d. The guide base 84a is contactable on the outer surface (left side surface) of the left counter weight 80. The guide support portions 84b, 84b are contactable on flat upper or lower surfaces of the left counter weight 80. In the hole portion 84c, the shall portion 50c of the left crank 50 is inserted.

The right counter weight etude 86 is configured to be similar to the left counter weight guide 84, and includes a guide base 86a, guide support portions 86b, 86b, a hole portion 86c, and screw hole portions 86d, 86d. The right counter weight guide 86 is secured to the screw boss portion (not illustrated) in the peripheral area of the depressed portion 22f of the front right housing 22b via screws 88, 88.

The left counter weight guide 84 guides the left counter weight 80 in the front-rear direction to restrict the movement of the left counter weight 80 in the front-rear direction. The right counter weight guide 86 guides the right counter weight 82 in the from-rear direction to restrict the movement of the right counter weight 82 in the front-rear direction.

A description will be given of the relation of the phase related to the eccentric portion 50b of the left crank 50 and the connecting rod coupling pin 71.

The connecting rod 56 is slightly up in front at the roller 57 (the rod 6) TDC in FIGS. 6A and 6B because of the relation between the rod central axis R and the motor central axis M. In the case of the reciprocating saw 1, the TDC is the frontmost point and the BDC is the rearmost point within the range of the movement in the front-rear direction.

Therefore, at the roller 57 TDC, a line P1 that connects the rotational center X of the left crank 50 to a connecting rod eccentric shaft center Y1 as the center of the connecting rod coupling pin 71 has an angle with respect to the motor central axis M. In the case of the reciprocating saw 1, this angle is approximately 15°. The line P1 corresponds to the center line of the connecting rod 56.

Then, a line Q1 that connects a counter weight eccentric shall center Z1 as the center of the eccentric portion 50b (and the eccentric portion 52b) to the rotational center X of the left crank 50 is configured to have an angle of 180° to 195° with respect to the line P1 viewing in the rotation direction (arrow W). That is, the eccentric portion 50b is configured such that the phase precedes with the counter eight eccentric shaft center Z1 having the angle of 180° to 195° with respect to a connecting rod eccentric shaft center Y1 viewing in the rotation direction. In the case of the reciprocating saw 1, this angle is 187°. In the reciprocating saw 1, the angle of the line Q1 with respect to the motor central axis M is 8°.

In the reciprocating saw 1, because of the relation between the rod central axis R and the motor central axis M, even if the counter weight eccentric shaft center Z1 has the angle of 180° with respect to the connecting rod eccentric shaft center Y1 viewing in the rotation direction, the left counter weight 80 and the right counter weight 82 do not reach the BDC yet when the roller 57 reaches the TDC. If the angle exceeds 180°, when the angle is equal to or less than 195° (180°+the angle of the line P1 with respect to the motor central axis M at the roller 57 TDC), the left counter weight 80 and the right counter weight 82 do not reach the BDC yet, or reach the BDC simultaneously when the roller 57 reaches the TDC.

When the roller 57 slightly rotates from the TDC to reach the counter weight BDC in FIGS. 7A and 7B, the roller 57 and the rod 6 come slightly backward from the TOC. However, when the counter weight eccentric shaft center Z1 has the angle of just 195° with respect to the connecting rod eccentric shaft center Y1 viewing in the rotation direction, the roller 57 reaches the TDC, and simultaneously, the counter weight Reaches the BDC.

In FIGS. 7A and 7B, a line P2 connecting the rotational center X of the left crank 50 to the connecting rod eccentric shaft center Y has an angle with respect to the motor central axis M. In the reciprocating saw 1, this angle is 7°. In the case of the angle 195° as described above, this angle is 0°.

A line Q2 connecting the counter weight eccentric shall center Z2 to the rotational center X of the left crank 50 corresponds to the motor central axis M.

That is, the phase where the left counter weight 80 and the right counter weight 82 reach the BDC delays with any angle in a range of 0° to 15° from the phase at the roller 57 TDC. In the reciprocating saw 1, the delay is approximately 8°.

When the roller 57 reaches the BDC in FIGS. 8A and 8B with further approximately half rotation, corresponding to the arrangement of the roller 57 with respect to the left crank 50 (such as the length of the connecting rod 56 and the position of the connecting rod coupling pin 71), a line P3 connecting the rotational center X of the left crank 50 to a connecting rod eccentric shaft center Y3 has to larger angle than the angle at the roller 57 TDC (FIGS. 6A and 6B) with respect to the motor central axis In the reciprocating saw 1, this angle is approximately 23°.

A line Q3 connecting a counter weight eccentric shaft center Z3 to the rotational center X of the left mink 50 has an angle with respect to the motor central axis M. In the reciprocating, saw 1, this angle is 16°.

When the left crank 50 rotates further by approximately 16° to teach the counter weight TDC in FIGS. 9A and 9B, the roller 57 and the rod 6 come slightly forward from the BDC.

A line P4 connecting the rotational center X of the left crank 50 in this case to a connecting rod eccentric shaft center Y4 has an angle with respect to the motor central axis M. In the reciprocating saw 1, this angle is approximately 7°.

A line Q4 connecting a counter weight eccentric shaft center Z4 to the rotational center X of the left crank 50 corresponds to the motor central axis M.

That is, the phase where the left counter weight 80 and the right counter weight 82 reach the TDC delays with any angle in a range of approximately 8° to 23° (adding 8° to the range of 0° to 15°) from the phase at the roller 57 BDC corresponding to the arrangement of the roller 57. In the reciprocating saw 1, the delay is approximately 16°.

From this state, the left crank 50 rotates by approximately half to return to the state in FIGS. 6A and 6B, and repeals to rotate as necessary.

A description will be given of an exemplary performance of the above described reciprocating saw 1.

An operator sets the blade on the stopped rod 6 such that the sawteeth come lower, and places the front portion of the shoe plate 77 of the guide shoe 12 on the workpiece. Then, in a state where the charged batteries 16, 16 (at least one of the batteries 16, 16) are mounted, the operator grips the handle portion 26 and turn on the switch 28. Accordingly, the power is fed to the motor 32 to rotate the motor shaft 37. Then, the left crank 50 rotates. The rotation of the left crank 50 transmits to the right crank 52 via the connecting rod coupling pin 71. Then, the right crank 52 rotates similarly to the left crank 50.

The movement of the connecting rod coupling pin 71 by the rotation of the left crank 50 causes the rod 6 to move back and forth via the connecting rod 56 and the roller 57.

While the rod 6 moves back and forth, the left counter weight 80 and the right counter weight 82 disposed on both side of the connecting rod 56, move back and forth symmetrically to the rod 6. This reduces the vibration transmitting outside the rod 6.

The counter weight mechanism 8 executes the reciprocation of the left counter weight 80 and the right counter weight 82 symmetrically to the rod 6. In moving back and forth, the left counter weight 80 and the right counter weight 82 contact the left counter weight guide 54 and the right counter weight guide 86, and are guided in the front-rear direction, respectively.

The left counter weight 80 and the right counter weight 82 have the identical weight to one another, and are symmetrically disposed on the rod 6 the connecting rod 56, the roller 57) as the center in the right-left direction. Therefore, compared with a case where one counter weight is disposed, the weight of the left counter weight 80 and the right counter weight 82 can be decreased with maintaining the weight and the vibration proof of the counter weight in total. This ensures the durability of the left counter weight 80 and the right counter weight 82, and the members coupled to these counter weights to be improved. The weight can be balanced in the right-left direction to prevent the swing (yaw) laterally around the vertical axis from occurring. This ensures the cutting by the reciprocating saw 1 to be easier. Then, the movement back and forth of the left counter weight 80 and the right counter weight 82 in approximately opposite direction to the rod 6 and the blade can ensure the balance to improve the vibration proof.

Further, the left counter weight 80 has the projecting portion 80b, which has the weight distribution with upper and lower symmetry without the interference to the roller guide 58 and the roller 57. The right counter weight 52 similarly has the projecting portion 82b. Then, the weight of the counter weight can be increased without interfering the performance of the reciprocating saw 1 and requiring, to ensure the extra space. Accordingly, the reciprocating saw 1 can be compacted with reducing the vibration further sufficiently and maintaining the smooth performance.

In the reciprocating saw 1, the phase where the left counter weight 84 and the right counter weight 82 (the counter weight) come the BDC delays by 8° from the phase at the roller 57 TDC. That is, when the connecting rod coupling pin 71 causes the rod 6 to reach the TDC, the eccentric portions 50*b* and 52*b* causes the counter weight to reach not the BDC but a point before the BDC.

Therefore, when the rod 6 reaches the TDC and slightly moves backward, the counter weight comes to the BDC. Then, in a stage where the blade begins to be pulled backward, the counter weight comes rearmost. Thus, the slight delay of the counter weight to reach the BDC from the rod 6 to reach the TDC causes the blade to receive the downward (the direction to the workpiece) three appropriately with preventing the vibration of the rod 6 and the blade. This causes the sawteeth of the blade to bite into the workpiece to make the cutting easier. Even if the counter weight reaches the BDC simultaneously with the rod 6 to reach the TDC, that is, even if the eccentric portions 50*b* and 52*b* cause the counter weight to reach the BDC just simultaneously when the connecting rod coupling pin 71 causes the rod 6 to reach the TDC, the vibration is prevented. If the counter weight reaches the BDC prior to the rod 6 to reach the TDC, the blade starting to move backward receives the upward force. This causes the cutting of the workpiece to be comparatively hard to be performed. On the other hand, the more delay of the phase where the counter weight reaches the BDC from the phase at the rod TDC, the more sufficiently the sawteeth of the blade bite into the workpiece. This makes even the workpiece with the larger cutting resistance to be performed the cutting easier. However, too much delay causes the counter weight to fail to adjust the weight balance with moving oppositely to the rod 6. This makes the vibration larger in the state of no-load or similar state.

The phase where the counter weight reaches the TDC delays by 16° from the phase at the roller 57 BDC. That is, when the connecting rod coupling pin 71 causes the rod 6 to reach the BDC, the eccentric portions 50*b* and 52*b* causes the counter weight to reach not the TDC but a point before the TDC.

Therefore, as well as the above-described case, this ensures the sawteeth of the blade to more properly bite into the workpiece with reducing the vibration. This makes the workpiece to be performed processing easier.

Further, depending on the arrangement of the eccentric portion 50*b* of the left crank 50 and the eccentric portion 52*b* of the right crank 52, the rod 6 moves back and forth in a state where the vibration is reduced. That is, the left crank 50 and the right crank 52 have the unbalanced weight distribution (the weight distribution viewing from the rotational center X) as a rotator because of the eccentric portions 50*b* and 52*b*. The left crank 50 and the right crank 52 play a role as the balancer that adjusts the vibration of the reciprocating saw 1 as a whole by the rotation.

That is, when the rod 6 and the blade are pulled backward from the roller 57 TDC (FIGS. 6A and 6B) to the miler 57 BDC (FIGS. 8A and 8B), the eccentric portions 50*b* and 52*b* of the left crank 50 and the right crank 52 (the crank) move in an arc shape on the upper half portion of the crank from the counter weight BDC (FIGS. 7A and 7B) to the counter weight TDC (FIGS. 9A and 9B). The most of the range from the roller 57 TDC to the roller 57 BDC overlaps the range from the counter weight BDC to the counter weight TDC.

Due to the above-described movement of the eccentric portions 50*b* and 52*b*, the center of gravity of the crank is moved upward when the blade is pulled. The counteraction of the movement applies the downward force to the reciprocating saw 1 (the portions other than the crank) to causes the blade to bite into the workpiece.

The blade is mounted with the sawteeth downwardly. That is, the blade is mounted such that the sawteeth face the side opposite to the side with the rod central axis R (the upper side in the up and down direction) viewing from the rotational center X of the crank (or the motor central axis M). The eccentric portions 50*b* and 52*b* of the crank are rotationally moved from the counter weight BDC (FIGS. 7A and 7B) to the counter weight TDC (FIGS. 9A and 9B) such that the center of gravity of the crank moves to the side with the rod central axis R (the upper side) viewing from the rotational center X of the crank.

When the rod 6 and the blade are pushed forward from the roller 57 BDC (FIGS. 8A and 8B) to the roller 57 TDC (FIGS. 6A and 6B), the eccentric portions 50*b* and 52*b* of the crank move in an arc shape on the lower half portion of the crank from the counter weight TDC (FIGS. 9A and 9B) to the counter weight BDC (FIGS. 7A and 7B). The most of the range from the roller 57 BDC to the roller 57 TDC overlaps the range from the counter weight TDC to the counter weight BDC. Then, when the blade is pushed, the blade receives the action by comparatively small force in the direction away from the workpiece. Accordingly, the blade is smoothly passed through the workpiece.

Further, the eccentric portions 50*b* and 52*b* of the crank also start to move on the upper half portion of the crank (FIGS. 7A and 7B) with the slight delay from the roller 57 TDC (FIGS. 6A and 6B), and terminate to move on the upper half portion (FIGS. 9A and 9B) with the slight delay from the roller 57 BDC (FIGS. 8A and 8B). This contributes the blade to bite into the workpiece as well as the counter eight.

Then, from the aspect of vibration reduction and blade bite by the above-described counter weight and the crank (balancer), the counter weight eccentric shaft centers Z1 to Z4 are preferably configured to be disposed on the position with an angle in a range of 180° to 195° with respect to the connecting rod eccentric shall centers Y1 to Y4.

When the operator pushes the handle portion 26 with the rod 6 and the blade in the operating state, the sawteeth on the lower side of the blade moving back and thrill contact the workpiece. Then the workpiece is cut in the up and down direction as the cutting direction.

When the operator turns the switch 28 off, the motor shaft 37 of the motor 32 are stopped so as to stop moving back and forth.

The above-described reciprocating saw 1 includes the motor 32, the left crank 50 and the right crank 52 rotated by the motor 32, the connecting rod 56 coupled to the connecting rod coupling pin 71 of the left crank 50 and the right crank 52, the rod 6 coupled to the connecting rod 56, the blade mounted on the rod fined having the sawteeth to perform cutting action to the workpiece, and the left counter weight 80 and the right counter weight 82 coupled to the eccentric portions 50*b* and 52*b* of the left crank 50 and the right crank 52. The reciprocating saw 1 has the rotational center X of the left crank 50 and the right crank 52. The rod 6 has the rod central axis R as the center axis. The rotational center X is disposed outside the rod central axis R of the rod 6. The blade is mounted such that the sawteeth are positioned on the side (the lower side in the up and down direction) opposite to the side with the rod central axis R viewing from the rotational center X of the left crank 50 and the right crank 52. The connecting rod coupling pin 71, and the eccentric portions 50b and 52b are disposed such that, at the position where the connecting rod coupling pin 71 causes the rod 6 to reach the TDC (frontmost position), the eccentric portions 50b and 52b cause the left counter weight 80 and the right counter weight 82 to reach as point before the BDC (rearmost position), and at the position where the connecting rod coupling pin 71 causes the rod 6 to reach the BDC, the eccentric portions 50b and 52b cause the left counter weight 80 and the right counter weight 82 to reach a point before the TDC. Then, the connecting rod 56 ensures to dispose the rod 6 other than on the motor central axis M. The left counter weight 80 and the right counter weight 82, and the eccentric portions 50b and 52b ensures the blade to bite into the workpiece to process the workpiece easily with reducing the vibration in accordance with the back and forth movement of the rod 6 and the blade.

The reciprocating saw 1 has a plurality of the left counter weight 80 and the right counter weight 82 across the rod central axis R. This ensures the weight balance of the counter weight to be more properly to improve the durability of the counter weight and the peripheral members of the counter weight, and to effectively reduce the vibration of the reciprocating saw 1 further.

Further, when the left counter weight 80 and the right counter weight 82 move horn the BDC to the TDC, the eccentric portions 50b and 52b are rotationally moved such that the center of gravity of the left counter weight 80 and the right counter weight 82 move (move on the upper half portion of the counter weight) to the side with the rod central axis R (the upper side in the up and down direction) viewing from the rotational center X of the left crank 50 and the right crank 52. This realizes the reciprocating saw 1 that further adjusts the vibration balance for easier operation with the back and forth movement of the counter weight.

Here, the embodiment of the disclosure is not limited to the above-described embodiments. For example, the following modifications are possible as necessary.

The right crank may have teeth to couple to the left crank, both crank may have teeth, and both crank may be coupled to one another by a gear or a group of gears to mesh with both crank.

The handle portion may be disposed in the right-left direction.

In the reciprocation converter, the gear format may be changed, and the number of the gear may be changed.

In the counter weight mechanism, the number of the counter weight may be one or two or more.

The shape of the various members may be changed. For example, the shape of the counter weight may be entirely block-shaped, and the shape of the guide surface of the counter weight guide may be the shape corresponding to the outer surface. The number, the arrangement of the various members may be changed. For example, two counter weight guides may be disposed with respect to one counter weight, the motor housing may be separated in the right part and the left part, the front housing may be integrated, and similar change maybe employed. Further, the various members may be changed to the members with the other configuration and the identical function. For example, instead of fixing by the screws, fixing by a claw portion and a lock portion, and similar fixing may be employed.

The blade may base teeth other than the sawteeth. A tool bit other than the blade may be employed.

Instead of the power feeding by the battery, the power feeding by the power supply cord may be employed.

The disclosure is applicable to a reciprocating cutting tool or a reciprocating tool other than the reciprocating saw, and applicable to a power tool.

According to a second aspect of the disclosure, which is in the first aspect of the disclosure, a plurality of the counter weights are disposed across the rod central axis.

According to a third and a fourth aspects of the disclosure, which is in the above-described disclosure, when the counter weight moves from the BDC to the TDC, the second eccentric shaft is rotationally moved such that the center of gravity of the counter weight moves to the side with the rod central axis or the extended line of the rod central axis viewing from the rotational center of the crank.

According to a fifth aspect of the disclosure, which is in the above-described disclosure, the second eccentric shall is disposed to have an angle from 180° to 195° with respect to the first eccentric shall viewing in the rotation direction of the crank.

According to a sixth aspect of the disclosure, which is in the above-described disclosure, a phase where the counter weight reaches the BDC delays with any angle in a range of 0° to 15° from a phase where the rod reaches the TDC.

According to a seventh aspect of the disclosure, which is in the above-described disclosure, a phase where the counter weight reaches the TDC delays with any angle in a range of 8° to 23° from a phase where the rod reaches the BDC.

With the reciprocating tool according to the embodiment, while the reciprocating tool has an output unit to reciprocate, the vibration can be reduced, and the output unit and a counter weight can be disposed more freely.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A reciprocating tool comprising,
a motor;
a first crank and a second crank rotated by the motor;
a connecting rod coupled to (a) a first eccentric shaft of the first crank and (b) a first eccentric shaft portion of the second crank, the first eccentric shaft being disposed eccentrically relative to a rotational center of the first crank and the first eccentric shaft portion being disposed eccentrically relative to a rotational center of the second crank;
a rod coupled to the connecting rod;
a tool bit with an action portion, the tool bit being mounted on the rod;
a first counter weight coupled to a second eccentric shaft of the first crank, the second eccentric shaft being disposed eccentrically relative to the rotational center of the first crank; and
a second counter weight coupled to a second eccentric shaft portion of the second crank, the second eccentric shaft portion being disposed eccentrically relative to the rotational center of the second crank; wherein
the second crank is separate from the first crank, the second counter weight is separate from the first counter weight, and the second eccentric shaft is separate from the second eccentric shaft portion, top dead center (TDC) is a frontmost position and bottom dead center (BDC) is a rearmost position of a range of movement of the first counter weight and the second counter weight in a front-rear direction, the rotational centers of the first crank and the second crank are not disposed on an extended line of a central axis of the rod, the tool bit is mounted such that the action portion is positioned on a side opposite to a side on which the rod is coupled to the connecting rod, the first eccentric shaft, the second eccentric shaft, the first eccentric shaft portion and the second eccentric shaft portion are disposed such that, at a position where the first eccentric shaft and the first eccentric shaft portion cause the rod to reach the TDC, the second eccentric shaft and the second eccentric shaft portion cause the first and second counter weights to reach the BDC or a point before the BDC, and at a position where the first eccentric shaft and the first eccentric shaft portion cause the rod to reach the BDC, the second eccentric shaft and the second eccentric shaft portion cause the first and second counter weights to reach a point before the TDC, and the first crank and the first counter weight are located on one side of the central axis of the rod and the second crank and second counter weight are located on a side of the central axis of the rod that is opposite to the first side.

2. The reciprocating tool according to claim 1, wherein when the first and second counter weights move from the BDC to the TDC, the second eccentric shaft and the second eccentric shaft portion are rotationally moved such that the centers of gravity of the first and second cranks move to the side with the rod central axis or the extended line of the rod central axis viewing from the rotational center of the first and second cranks.

3. The reciprocating tool according to claim 1, wherein the second eccentric shaft is disposed to have an angle from 180° to 195° with respect to the first eccentric shaft viewing in the rotation direction of the first crank; and the second eccentric shaft portion is disposed to have an angle between 180° to 195° with respect to the first eccentric shaft portion viewing in the rotation direction of the second crank.

4. The reciprocating tool according to claim 1, wherein when the rod reaches the TDC, the first and second counter weights are at an angle of 0° to 15° from the BDC.

5. The reciprocating tool according to claim 1, wherein when the rod reaches the BDC, the first and second counter weights are at an angle of 8° to 23° from the TDC.

6. The reciprocating tool according to claim 1, wherein the first counter weight has a first hole to receive first eccentric portions of the first crank, the second eccentric shaft being one of the first eccentric portions, the second eccentric shaft moves up and down in the first hole, the second counter weight has a second hole to receive second eccentric portions of the second crank, the second eccentric shaft portion being one of the second eccentric portions, and the second eccentric shaft portion moves up and down in the second hole.

7. The reciprocating tool according to claim 1, wherein the first counter weight and the second counter weight each has a projecting portion.

8. The reciprocating tool according to claim 7, wherein the projecting portions are aligned with a shaft of the motor.

9. The reciprocating tool according to claim 1, wherein the centers of gravity of the first and second counter weights and the centers of gravity of the first and second cranks move.

10. The reciprocating tool according to claim 1, wherein the first and second counter weights reciprocate in the front-rear direction.

11. A reciprocating tool having a longitudinal axis, comprising:
   a motor;
   a crank that has (1) a disc shape, (2) opposing side faces that are parallel to the longitudinal axis of the reciprocating tool, (3) a rotational axis that is perpendicular to the longitudinal axis, and (4) a first eccentric shaft and a second eccentric shaft each (a) protruding from the opposing side faces perpendicular to the longitudinal axis and (b) having a central axis that is parallel to and offset from the rotational axis of the crank;
   a connecting rod coupled to the first eccentric shaft of the crank;
   a rod extending parallel to the longitudinal axis and rotatably coupled to the connecting rod;
   a tool bit with an action portion, the tool bit being mounted to the rod; and
   a counter weight coupled to the second eccentric shaft of the crank;
   wherein:
   the crank is rotated around the rotational axis by the motor,
   the rotational axis of the crank is not disposed on an extended line of a center axis of the rod,
   the first eccentric shaft and the second eccentric shaft are disposed such that:
      at a position where the first eccentric shaft causes the rod to reach a top dead center, the second eccentric shaft causes the counter weight to reach a bottom dead center or a point before the bottom dead center, and
      at a position where the first eccentric shaft causes the rod to reach the bottom dead center, the second eccentric shaft causes the counter weight to reach a point before the top dead center,
   the first eccentric shaft moves the rod back and forth via the connecting rod when the crank rotates,
   the central axis of the first eccentric shaft and the central axis of the second eccentric shaft are disposed on opposite sides of the rotational axis of the crank,
   the first eccentric shaft and the second eccentric shaft protrude in opposite directions from the crank, and
   the second eccentric shaft moves the counter weight back and forth when the crank rotates, and the second eccentric shaft moves in an arc shape on an upper half portion of the crank when the counter weight moves from the bottom dead center to the top dead center.

12. The reciprocating tool according to claim 11, wherein an angle defined by (a) a line connecting the rotational axis of the crank to the center axis of the first eccentric shaft and (b) a line passing through the rotational axis of the crank parallel to the longitudinal axis of the reciprocating tool when the rod is positioned at the top dead center is smaller than an angle defined by (a) a line connecting the rotational axis of the crank to the center axis of the first eccentric shaft and (b) a line passing through the rotational axis of the crank and extending parallel to the longitudinal axis of the reciprocating tool when the rod is positioned at the bottom dead center.

13. The reciprocating tool according to claim 11, wherein when the rod is positioned at the top dead center, an angle defined by (a) a line connecting the rotational axis of the crank to the center axis of the first eccentric shaft and (b) a line passing through the rotational axis of the crank and extending parallel to the longitudinal axis is larger than an angle defined by (a) a line connecting the rotational axis of the crank to the center axis of the second eccentric shaft and (b) a line passing through the rotational axis of the crank and extending parallel to the longitudinal axis.

14. The reciprocating tool according to claim 11, wherein when the rod is positioned at the top dead center, the center axis of the first eccentric shaft is positioned above a horizontal line passing through the rotational axis of the crank and extending parallel to the longitudinal axis and the center axis of second eccentric shaft is positioned below a line passing through the rotational axis of the crank and extending parallel to the longitudinal axis.

15. The reciprocating tool according to claim 11, further comprising a second counter weight located on the opposite side of the central axis of the rod from the counter weight.

16. The reciprocating tool according to claim 11, wherein the second eccentric shaft is disposed to have an angle from 180° to 195° with respect to the first eccentric shaft viewing in a rotation direction of the crank.

17. The reciprocating tool according to claim 11, wherein when the counter weight reaches the bottom dead center, the rod is in a range of 0° to 1520 from the top dead center.

18. The reciprocating tool according to claim 11, wherein when the counter weight reaches the top dead center, the rod is in a range of 0° to 15° from the bottom dead center.

19. A reciprocating tool having a longitudinal axis, comprising:
a motor;
a crank that has (1) a disc shape, (2) opposing side faces that are parallel to the longitudinal axis of the reciprocating tool, (3) a rotational axis that is perpendicular to the longitudinal axis, and (4) a first eccentric shaft and a second eccentric shaft each (a) protruding from the opposing side faces perpendicular to the longitudinal axis and (b) having a central axis that is parallel to and offset from the rotational axis of the crank;
a connecting rod coupled to the first eccentric shaft of the crank;
a rod that is rotatably coupled to the connecting rod and mounts a tool bit; and
a counter weight coupled to the second eccentric shaft of the crank;
wherein:
the crank is rotated around the rotational axis by the motor,
the rotational axis of the crank is not disposed on an extended line of a center axis of the rod,
the first eccentric shaft and the second eccentric shaft are disposed such that:
at a position where the first eccentric shaft causes the rod to reach a top dead center, the second eccentric shaft causes the counter weight to reach a bottom dead center or a point before the bottom dead center, and
at a position where the first eccentric shaft causes the rod to reach the bottom dead center, the second eccentric shaft causes the counter weight to reach a point before the top dead center,
the first eccentric shaft moves the rod back and forth via the connecting rod when the crank rotates,
the central axis of the first eccentric shaft and the central axis of the second eccentric shaft are disposed on opposite sides of the rotational axis of the crank, and
the second eccentric shaft moves in an arc and moves the counter weight back and forth when the crank rotates such that the counter weight moves between the bottom dead center and the top dead center,
the first eccentric shaft and the second eccentric shaft protrude in opposite directions from the crank, and
when the rod is positioned at the top dead center, an angle defined by (a) a line connecting the rotational axis of the crank to the central axis of the first eccentric shaft and (b) a line passing through the rotational axis of the crank and extending parallel to the longitudinal axis is larger than an angle defined by (a) a line connecting the rotational axis of the crank to the central axis of the second eccentric shaft and (b) a line passing through the rotational axis of the crank and extending parallel to the longitudinal axis.

20. The reciprocating tool according to claim 19, wherein the rod extends parallel to the longitudinal axis.

* * * * *

UNITED STATES PATENT AND TRADEMARK OFFICE
CERTIFICATE OF CORRECTION

PATENT NO.       : 10,259,060 B2
APPLICATION NO.  : 15/045692
DATED            : April 16, 2019
INVENTOR(S)      : Yudai Sugino et al.

It is certified that error appears in the above-identified patent and that said Letters Patent is hereby corrected as shown below:

In the Claims

Column 17, Line 30, please amend Claim 17 as follows:
17. The reciprocating tool according to claim 11, wherein when the counter weight reaches the bottom dead center, the rod is in a range of 0° to 15° from the top dead center.

Signed and Sealed this
Twentieth Day of August, 2019

Andrei Iancu
*Director of the United States Patent and Trademark Office*